(12) United States Patent
Bloomfield

(10) Patent No.: US 7,795,839 B2
(45) Date of Patent: Sep. 14, 2010

(54) PARALLEL HYBRID VEHICLE OPTIMAL STORAGE SYSTEM

(75) Inventor: Aaron Bloomfield, Bowling Green, OH (US)

(73) Assignee: Bowling Green State University, Bowling Green, OH (US)

( * ) Notice: Subject to any disclaimer, the term of this patent is extended or adjusted under 35 U.S.C. 154(b) by 0 days.

(21) Appl. No.: 12/728,414

(22) Filed: Mar. 22, 2010

(65) Prior Publication Data

US 2010/0174433 A1   Jul. 8, 2010

Related U.S. Application Data

(62) Division of application No. 11/373,952, filed on Mar. 13, 2006, now Pat. No. 7,683,569.

(51) Int. Cl.
　　*H02J 7/14*　　(2006.01)
　　*B60K 6/44*　　(2007.10)
　　*B60W 10/04*　(2006.01)
　　*H02J 3/46*　　(2006.01)
　　*G05F 3/06*　　(2006.01)

(52) U.S. Cl. .................. 320/104; 320/110; 320/125; 320/138; 180/65.225; 180/65.29; 307/149; 307/151

(58) Field of Classification Search .................. 320/106
See application file for complete search history.

(56) References Cited

U.S. PATENT DOCUMENTS

| | | | |
|---|---|---|---|
| 6,484,830 B1 * | 11/2002 | Gruenwald et al. | 180/65.245 |
| 2004/0232883 A1 * | 11/2004 | Ochiai et al. | 320/125 |
| 2006/0021809 A1 * | 2/2006 | Xu et al. | 180/65.2 |

* cited by examiner

*Primary Examiner*—Edward Tso
*Assistant Examiner*—Yalkew Fantu
(74) *Attorney, Agent, or Firm*—Roger A. Gilcrest

(57) ABSTRACT

The present invention is a method and apparatus by which power is controlled in a hybrid electric vehicle such that high levels of performance and efficiency are realized. The present invention includes a method and apparatus developed to optimize the use of energy in a hybrid vehicle application from the hybrid energy storage device. The method and apparatus of the present invention is particularly useful with energy storage devices there the energy state, such as the state of charge, is readily determined by an easily measured attribute. Ultracapacitors and hydraulic storage cylinders are examples of the types of energy storage devices to which the present invention may be applied.

6 Claims, 5 Drawing Sheets

Effect of Successive Partial Charge Events on Energy Storage Potential of Hybrid System
No Level Adjustment

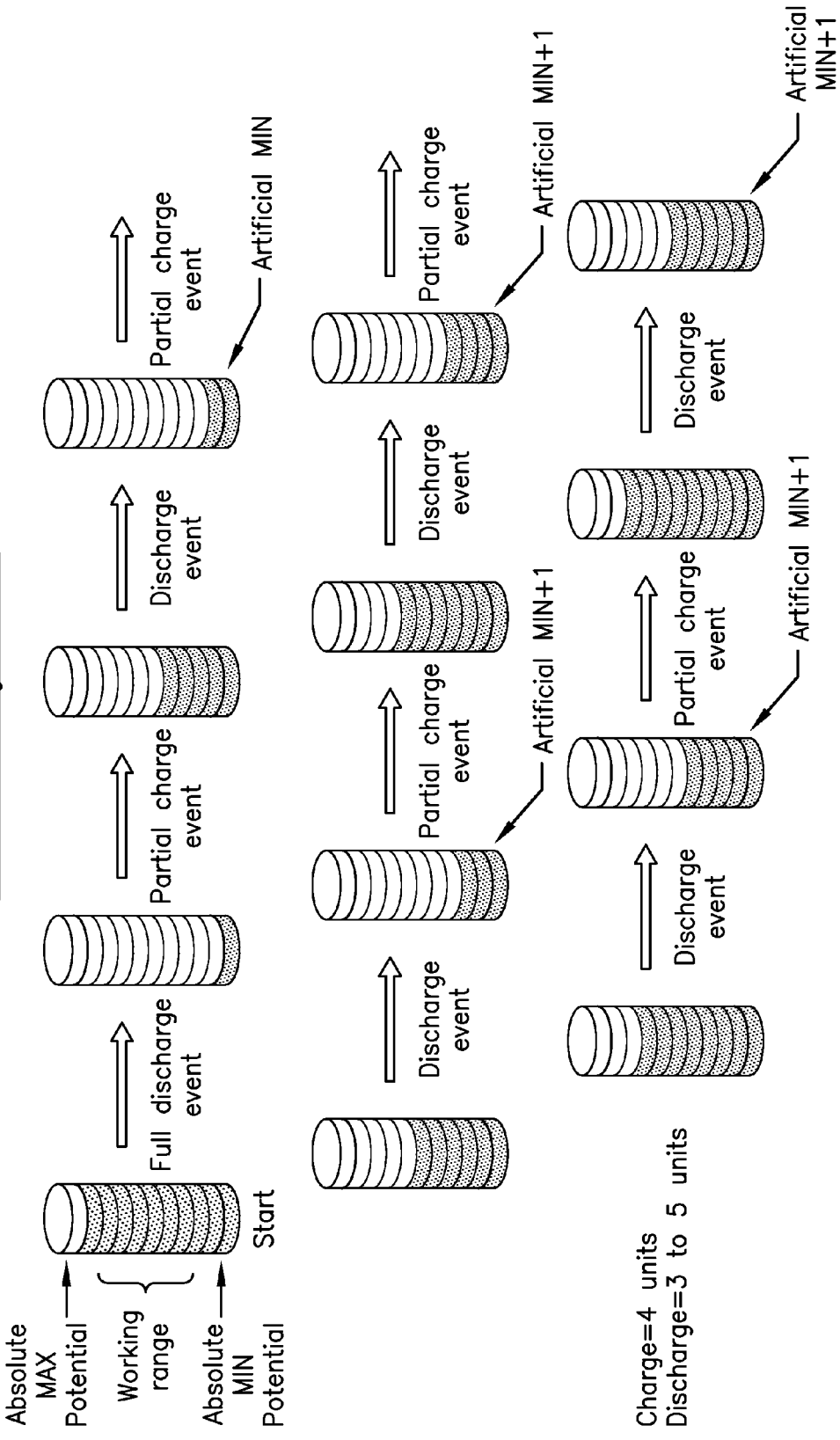

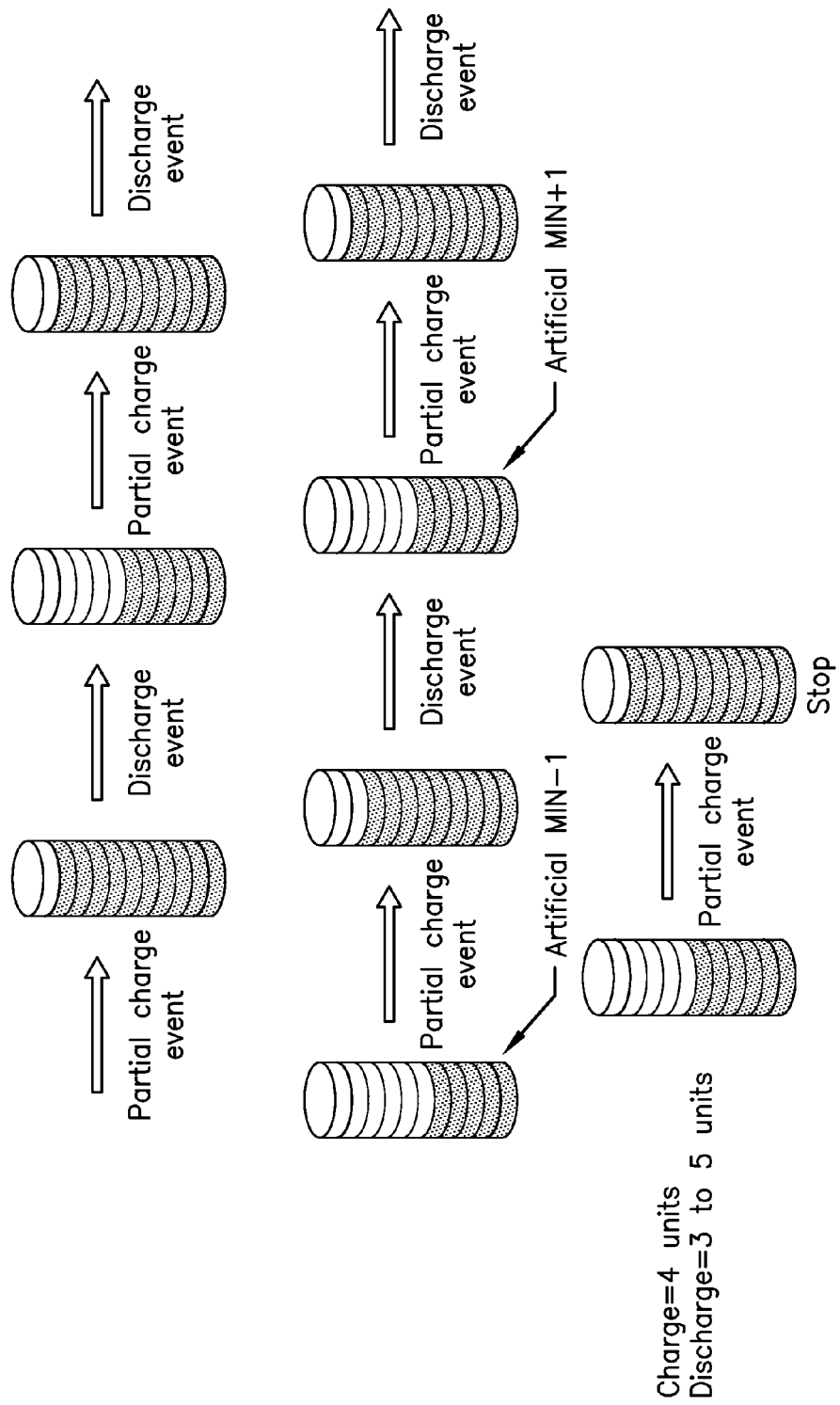

PARALLEL HYBRID VEHICLE OPTIMAL STORAGE SYSTEM

RELATED APPLICATION DATA

This application is a divisional of U.S. application Ser. No. 11/373,952, filed Mar. 13, 2006, which is hereby incorporated herein in its entirety by reference.

TECHNICAL FIELD OF THE INVENTION

The present invention is in the field of hybrid vehicles, such as hybrid electric vehicles.

BACKGROUND AND SUMMARY OF THE INVENTION

The present invention relates to an environmental friendly vehicle. More particularly, the present invention relates to hybrid vehicles, such as hybrid electric vehicles (HEVs).

Hybrid electric vehicles include an internal combustion engine and at least one electric motor powered by a battery array. The HEV of the present invention uses an engine in combination with an electric motor. An energy storage device is also used to store energy for driving the electric motor. The engine, preferably in conjunction with a generator (for series drive embodiment or without for a parallel embodiment), and the energy storage device work in combination to provide energy for powering the vehicle motor. A series HEV typically uses an engine with a generator (APU/PPU) to supply electricity to the motor and the energy storage system. A parallel HEV has a direct mechanical connection between the engine and the wheels. The use of electric power substantially cuts down on chemical emissions and vastly improves fuel economy.

In a parallel type hybrid electric vehicle, both the internal combustion engine and the electric motor are coupled to the drive train via mechanical means. The electric motor may be used to propel the vehicle at low speeds and to assist the internal combustion engine at higher speeds. The electric motor may also be driven, in part, by the internal combustion engine and be operated as a generator to recharge the battery array.

In a series type hybrid electric vehicle, the internal combustion engine is used only to run a generator that charges the battery array. There is no mechanical connection of the internal combustion engine to the vehicle drive train. The electric traction drive motor is powered by the battery array and is mechanically connected to the vehicle drive train.

Although HEVs have been previously known, the HEV technology of the present invention provides significant advantages of providing a viable HEV technology that allows for a high performance HEV with a unique management of the charge and energy distribution system.

Other features of the invention will become apparent as the following description proceeds and upon reference to the drawings.

In general terms, the present invention includes an energy storage system, the energy storage system adapted to accept energy so as to be capable of discharging and accepting energy through a series of discharge and energy acceptance events, and having a maximum energy state level and an actual minimum energy state level; and wherein the power unit and the energy storage system provide electricity to the electric motor for powering the vehicle; and an energy storage controller programmed to control the energy storage system by setting an artificial minimum energy state level to an initial level above the actual minimum energy state level, and, during a series of discharge and energy acceptance events, to be able to adjust the artificial minimum energy state level such that:

(a) in the case where a discharge and energy acceptance event results in the acceptance of insufficient energy to replenish the energy storage system to the maximum energy state level, the artificial minimum energy state level is raised; and (b) in the case where a discharge and energy acceptance event results in the acceptance of sufficient energy to replenish the energy storage system to the maximum energy state level, the artificial minimum energy state level is lowered.

The energy storage controller preferably is further programmed to control the energy storage system by restricting the raising of the artificial minimum energy state level beyond a predetermined level below the maximum energy state level. It is also preferred that the energy storage controller is further programmed to control the energy storage system by restricting the lowering of the artificial minimum energy state level beyond a predetermined level above the actual minimum energy state level.

The energy storage system may comprise energy storage systems of any type capable of energy discharge acceptance events such as those selected from the group of: (1) at least one ultracapacitor and (2) at least one hydraulic cylinder. The energy storage system may also comprise an internal combustion engine and a generator adapted to provide energy to the energy storage system, such as electric energy.

The present invention also includes a method of controlling an energy storage system, the method comprising: providing an energy storage system electrically coupled to a power conversion device, the energy storage system adapted to recapture energy from the power conversion device so as to be capable of discharging and recapturing energy through a series of discharge and energy acceptance events, and having a maximum energy state level and an actual minimum energy state level; and the energy storage system providing energy to the power conversion device, and the power conversion device adapted to supply energy to the energy storage system; and an energy storage controller programmed to control the energy storage system by setting an artificial minimum energy state level to an initial level above the actual minimum energy state level, and, during a series of discharge and energy acceptance events, to be able to adjust the artificial minimum energy state level such that:

(a) in cases where a discharge and energy acceptance event results in the acceptance of insufficient energy to recharge the energy storage system to the maximum energy state level, raising the artificial minimum energy state level; and (b) in cases where a discharge and energy acceptance event results in the acceptance of sufficient energy to recharge the energy storage system to the maximum energy state level, lowering the artificial minimum energy state level.

The present invention also includes a method and apparatus by which power is controlled in a hybrid electric vehicle such that high levels of performance and efficiency are realized. The invention relates specifically to the alternate energy source and optimization of its use.

The present invention includes a method and apparatus developed to optimize the use of energy in a hybrid vehicle application from the hybrid energy storage device.

The method and apparatus of the present invention is particularly useful with energy storage devices where the state of charge is readily determined by an easily measured attribute.

Ultracapacitors and hydraulic storage cylinders are examples of the types of energy storage devices to which the present invention may be applied.

The state of charge, or energy level, is proportional to the voltage of the ultracapacitor or the pressure of the hydraulic cylinder. The method and apparatus of the present invention is particularly well-suited to hybrid vehicle applications where the hybrid power is primarily utilized during acceleration and deceleration.

The present invention is particularly well-suited to hybrid electric vehicle applications where the hybrid power is primarily used during acceleration and deceleration. The method includes three fundamental features which may be illustrated with respect to a parallel hybrid electric vehicle using storage of the type described above: (1) energy is expended from the hybrid energy storage device at a predetermined rate until a minimum energy level target is reached, whereupon the energy storage device is later replenished with energy from the vehicle. There is an equilibrium of energy expended to that replenished that will result; (2) the minimum energy target is continuously adjusted such that that equilibrium can be maintained at a higher power state of the storage device; and (3) replenishing the energy storage device with both the kinetic energy from the vehicle while decelerating, and with energy drawn from the primary power source of the vehicle during opportune events (i.e., typically when the vehicle is cruising or coasting, such as when moving downhill or otherwise not in need of accelerating power).

In one aspect of the invention, during vehicle acceleration, when hybrid energy is desired, energy is expended from the hybrid energy storage device at a pre-determined rate until a target minimum energy level is reached. Subsequently, during deceleration the recapture of energy from the kinetic energy of the vehicle to replenish the storage device is maximized. The more energy recovered in the energy storage device prior to a given acceleration event, the more energy that can be expended in that acceleration event.

In contrast to earlier methods, the method of the present invention features a system that is self-adjusting and will seek equilibrium with the energy balance of what is expended and replenished. The method of the present invention does not utilize fixed relationships between the hybrid storage level and vehicle state such as, for example, energy level and vehicle speed. Accordingly, changes to the energy and power requirements of the vehicle due to variations in terrain, drive cycle, vehicle weight, tire pressure, and the like will not adversely affect its performance. The hybrid drive following the minimum target level strategy will naturally adjust its contribution to maintain consistent vehicle performance and operator/passenger feel.

The rate at which energy is expended from the energy storage device may be any rate, so long as it is consistent.

The present invention also includes the adjustment of the minimum energy target level continuously so the energy storage device and corresponding power conversion system maintain a higher power state at equilibrium. For the energy storage devices described herein, the power is a product of the potential and flow. Accordingly, for a given flow, a higher potential will provide higher power.

There are two advantages to maintaining a higher potential. First, available hybrid power will be more consistent with peak power despite drive cycles with low vehicle kinetic energy. Second, for powers less than peak power of the system, a higher potential means less flow required. For energy storage devices such as Ultracapacitors and hydraulic cylinders, and the corresponding power conversion systems, lower flow means less energy loss as heat and thus higher efficiency. In addition, lower heat loss means that cooling systems do not work as hard.

In operation, each time the hybrid vehicle comes to rest at zero speed, and accounting for settling time of the storage device, the energy level of the storage device can be evaluated to see if the level has reached maximum capacity. If not, the minimum energy target level can then be raised. If so, the minimum target level can be lowered. This process repeats until equilibrium is reached. Anticipating disruptions to equilibrium will maximize the effectiveness of the strategy.

In another aspect of the invention, the higher energy level of the storage device prior to acceleration, the more that can be expended by way of hybrid assist. Striving for maximum hybrid contribution, two approaches as presented for increasing the amount of energy available prior to an acceleration event, beyond what is recovered during vehicle deceleration with regenerative braking.

One approach is to "siphon" power from the primary power source while it is operating at high efficiency or while it could be made to operate more efficiently. That is, to charge the energy storage system from the primary power source at a nominal rate that is just enough so as not to drastically alter its operation. Examples of operating points ideally suited for siphoning include when the vehicle is cruising at a steady state where fuel economy is relatively high and when the vehicle is stopped with the engine at idle doing little work with fixed operating overhead.

A small siphon charge over a period of time can significantly increase the energy level of the storage device. As a means to preserve storage capacity for the vehicle deceleration with regenerative braking, a target energy level is set below which siphoning is permitted. The target energy level is established in some relation to the kinetic energy of the vehicle.

The other approach is to simulate the drag normally associated with internal combustion engines at closed throttle through the use of regenerative braking. By applying a moderate level of regenerative braking when the operator lifts from the accelerator pedal, the vehicle will decelerate slightly and the energy storage device will be charged at a low rate.

The present invention allows for consistency in the power output during acceleration which is proportionate to apparent power demand.

The method and apparatus of the present invention feature the function of certain algorithms for system control. These algorithms use real-time inputs from the vehicle systems and provide real-time outputs for control of vehicle systems. The principal function of the present invention is to supplement the primary power source in a manner that is relatively transparent to the operator while preserving standard, consistent vehicle performance. This allows for consistent feel to the operator and the passengers as the vehicle accelerates and decelerates.

The present invention features a control algorithm that maintains the state of charge of the energy storage device (such as one or more ultracapacitors) within a pre-determined range as the vehicle proceeds through a number of energy expending and recapture events which may involve net energy loss or net energy gain.

The present invention is an improvement over the technology described in U.S. Pat. Nos. 6,484,830 and 6,651,759, which are hereby incorporated herein by reference, and which may be used with hybrid electric vehicles and drive systems as described therein as an example.

In general terms, the present invention includes a hybrid electric vehicle comprising a drive train; an electric motor for driving the drive train; a power unit electrically coupled to the electric motor; an electric energy storage system electrically coupled to the electric motor, the electric energy storage system adapted to recapture energy from the braking of the vehicle so as to be capable of discharging and recapturing energy through a series of discharge and energy recapture events, and having a maximum charge level and an actual minimum charge level; and wherein the power unit and the electric energy storage system provide electricity to the electric motor for powering the vehicle; and an electric energy storage controller programmed to control the electric energy storage system by setting an artificial minimum charge level to an initial level above the actual minimum charge level, and, during a series of discharge and energy recapture events, to be able to adjust the artificial minimum charge level such that: (a) in the case where a discharge and energy recapture event results in the recapture of insufficient energy to recharge the electric energy storage system to the maximum charge level (e.g., the energy discharged in an acceleration and the energy recaptured from braking after that acceleration), the artificial minimum charge level is raised; and (b) in the case where a discharge and energy recapture event results in the recapture of sufficient energy to recharge the electric energy storage system to the maximum charge level, the artificial minimum charge level is lowered.

It is preferred that the electric energy storage controller is further programmed to control the electric energy storage system by restricting the raising of the artificial minimum charge level beyond a predetermined level below the maximum charge level.

It is preferred that the electric energy storage controller is further programmed to control the electric energy storage system by restricting the lowering of the artificial minimum charge level beyond a predetermined level above the actual minimum charge level.

The present invention may be applied to any energy storage system, although, in the case of a hybrid electric vehicle, it is preferred that the energy storage system is a bank of Ultracapacitors, and that this system be used in association with an internal combustion engine and a generator adapted to charge the energy storage system with electrical energy.

Another aspect of the present invention is a hybrid electric vehicle comprising a drive train; an electric motor for driving the drive train; a power unit electrically coupled to the electric motor; an electric energy storage system electrically coupled to the electric motor, the electric energy storage system adapted to recapture energy from the braking of the vehicle so as to be capable of discharging and recapturing energy through a series of discharge and energy recapture events, and having a maximum charge level and an actual minimum charge level having a working range therebetween and which working is defined at its lower end by an artificial minimum charge level; and wherein the power unit and the electric energy storage system provide electricity to the electric motor for powering the vehicle; and an electric energy storage controller programmed to control the electric energy storage system by setting an artificial minimum charge level to an initial level above the minimum charge level, and, during a series of discharge and energy recapture events, to be able to adjust the artificial minimum charge level such that the working range of the electric energy storage system is biased toward the maximum charge level over the series of discharge and energy recapture events.

The present invention also includes a method of controlling an energy storage system, the method comprising: providing an electric energy storage system electrically coupled to the electric motor, the electric energy storage system adapted to recapture energy from the braking of the vehicle so as to be capable of discharging and recapturing energy through a series of discharge and energy recapture events, and having a maximum charge level and an actual minimum charge level; and wherein the power unit and the electric energy storage system provide electricity to the electric motor for powering the vehicle; and an electric energy storage controller programmed to control the electric energy storage system by setting an artificial minimum charge level to an initial level above the actual minimum charge level, and, during a series of discharge and energy recapture events, to be able to adjust the artificial minimum charge level such that: (a) in the case where a discharge and energy recapture event results in the recapture of insufficient energy to recharge the electric energy storage system to the maximum charge level, raising the artificial minimum charge level; and (b) in the case where a discharge and energy recapture event results in the recapture of sufficient energy to recharge the electric energy storage system to the maximum charge level, lowering the artificial minimum charge level.

The method of the present invention thus maintains the charge level of the energy storage device, such as an ultracapacitor, at a level in the higher end of the charge range over time.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 2 is a schematic of an energy storage system describing the extent of the charge and discharge of the energy storage system as it proceeds through a series of energy discharge and recapture events while being controlled by the method and system of one embodiment of the present invention.

DETAILED DESCRIPTION OF THE PREFERRED EMBODIMENTS

Figure 1:
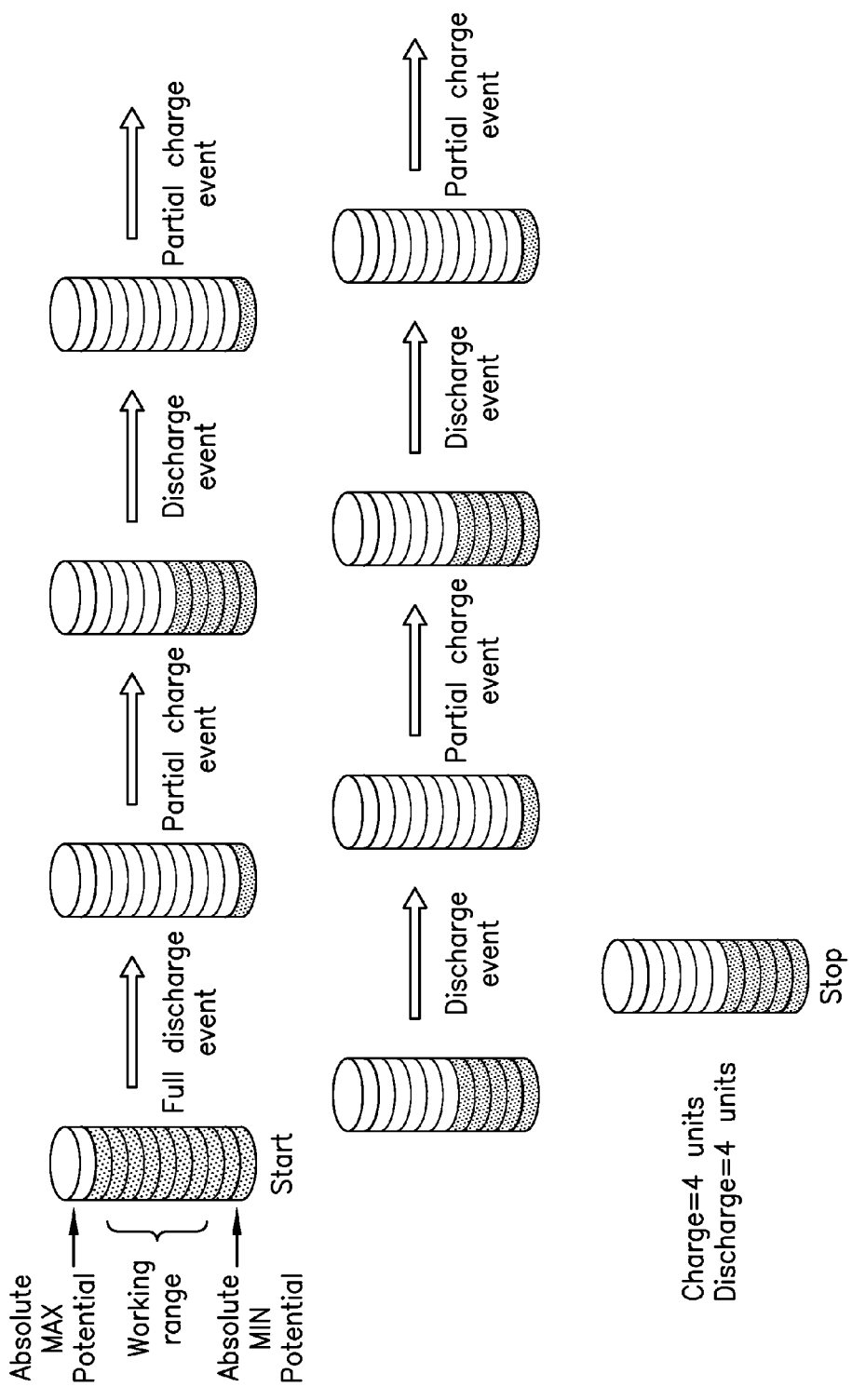
FIG. 1 is a schematic of an energy storage system describing the extent of the charge and discharge of the energy storage system as it proceeds through a series of energy discharge and recapture events.

In accordance with the foregoing summary of the invention, the following presents a detailed description of the preferred embodiments, which are considered to be the best mode thereof.

Energy storage devices like the ultracapacitor and hydraulic cylinder can be charged or discharged only with a change in energy potential. Energy storage is typically sized for the recapture of vehicle (system) kinetic energy from some maximum speed, representing a full charge event, referred to herein as an energetically favorable event.

A full discharge/charge event of the energy storage device will utilize the absolute maximum and minimum energy levels (potentials) of the device. This is the full working range of the device. Partial discharge/charge events will utilize only a portion of the full working range. These typically will be events wherein the energy expended will be only partially replaced by the energy recaptured during regenerative braking, referred to herein as an energetically disfavorable event. The working range of partial discharge and charge events will tend toward the absolute minimum potential of the energy storage. The present invention takes advantage of the fact that a working range nearer the absolute maximum potential has an advantage over a working range nearer the absolute minimum. In order to move the working range toward the maximum in partial charge events, an artificial minimum level must be utilized rather than the absolute. The artificial minimum must be set between the absolute minimum and the absolute maximum. The artificial minimum is adjusted upward after a charge event if the absolute maximum potential is not reached (i.e., after an energetically disfavorable event). The adjustment upward may be a constant increment value. Conversely, the artificial minimum is adjusted downward toward the absolute minimum after a charge event if the maximum absolute potential is reached (i.e., after an energetically favorable event). The adjustment downward may also be a constant decrement value. The artificial minimum level is adjusted after a charge event as long as the energy state of the storage device has not reached or exceeded the absolute maximum.

The present invention accordingly allows one to achieve a balance between energy expended and replenished. That is, the net charge energy ought to be greater than or equal to the discharge energy of the storage device. A net loss of energy charge-to-discharge will tend to drive the working range of the device to the minimum potential.

A portion of the vehicle (system) kinetic energy is unavailable for charging the energy storage because of electrical and mechanical losses. To help achieve the balance between energy expended and replenished, the present invention attempts to limit the discharge energy to less than the charge energy. One approach is to discharge to vehicle speed A and charge from vehicle speed B where speed A is less than B. Another is to limit the discharge maximum power to less than the maximum charge power.

The present invention may also be applied to limit the artificial minimum to some maximum value so as to preserve a determined working range.

The present invention thus utilizes a strategy that optimizes the energy storage use over successive discharge/charge events. The average use is optimized not necessarily any one event.

Level determination and adjustment of the energy storage can be achieved, for instance, through either measuring energy potential or counting energy units in and out.

The process of limit adjustment will tend to preserve the optimal working range of an energy storage bank regardless of the capacity. Ideally and preferably, one may initialize the artificial minimum limit to the midpoint of the absolute minimum and maximum levels.

Without using the method of the present invention, the energy storage utilization will be driven toward the low power range of the storage device. This is especially the case with energy storage devices with more capacity than the kinetic energy of the vehicle or system.

Enhancement of the strategy is recommended to ensure all requests for power are satisfied with some hybrid power regardless of the energy level of the storage device. Also, in cases where a future charge event will be more favorable in terms of energy recapture, a lower artificial minimum can be set to allow more energy than normal to be expended at present. This may require a "fuzzy" or non-strict implementation of the artificial minimum. Fuzzy logic and/or expert systems can be utilized to predict future behavior based on past and present behavior. This may be especially successful with vehicles and systems with specific and consistent missions. In the case of vehicles, the use of GPS satellite data can provide valuable information to this end, such as overall route length, numbers and distance between acceleration and deceleration events, etc.

FIG. 1 is a schematic of an energy storage system describing the extent of the charge and discharge of the energy storage system as it proceeds through a series of energy discharge and energy recapture events. As may be appreciated from this Figure, an electric energy storage device (i.e., a capacitor; represented by a cylinder) proceeds through a series of energy discharge and energy recapture events while acceleration of the vehicle and regenerative braking occurs. FIG. 1 shows that, in instances where there is no control over the lower charge limit of the capacitor, the charge of the capacitor continues to drop over successive energy discharge and energy recapture events that are energetically disfavorable (i.e., where the output of energy upon acceleration exceeds the energy recaptured upon regenerative braking).

In contrast, FIG. 2 is a schematic of an energy storage system describing the extent of the charge and discharge of the energy storage system as it proceeds through a series of energy discharge and recapture events while being controlled by the method and system of one embodiment of the present invention. FIG. 2 shows that in accordance with the present invention the lower charge limit of the capacitor is controlled and adjusted. As shown in FIG. 2, the charge of the capacitor drops in the case of an energy discharge and energy recapture event that is energetically disfavorable (i.e., where the output of energy upon acceleration exceeds the energy recaptured upon regenerative braking). In such cases, the controller of the present invention adjusts an artificial lower charge limit upward and above the absolute lowest charge level (i.e., the level of complete discharge). For instance, FIG. 2 shows a fully charged capacitor which proceeds through a full discharge event followed by a partially charging capture event. Thereafter, an artificial lower charge limit is set such that a subsequent discharge prevents complete discharging of the capacitor. During a subsequent discharge event, the capacitor is restricted from discharging below the artificial lower charge limit. Subsequently, and as this event is energetically unfavorable, the artificial lower charge limit is again raised from the previously set artificial lower charge limit. This process may be allowed to continue until an energy discharge and energy recapture event results in the complete recharging of the capacitor. In this instance, the artificial lower charge limit is lowered to a point lower than previously set, and above the absolute lowest charge level.

The apparatus and methods of the present invention may be produced using microprocessors and computer languages known and used in the art.

An example of an algorithm in pseudo code showing the adjustment of the artificial minimum charge level with the energy storage potential measured following a deceleration event is shown below. This may be used to bring about the control of the energy storage system of the present invention and may be understood by reference to the following logic for adjusting the minimum charge level with optional reference to system torque:

Pseudo Code for Adjusting Artificial Minimum Charge Level

Energy Storage Potential Measured Following a Deceleration Event

Simplest Form

The following algorithm is executed every iteration of the control loop. Ideally, the control loop is executed several times per second.

The variables, constants, and flags indicated in the algorithm are defined as follows:

VehicleSpeed, variable, measure of vehicle ground speed.
PotentialLevel, variable, measure of energy storage potential (e.g. voltage).
TargetLevel, variable, artificial minimum potential level to reach during discharge events, can be initialized to the midpoint between MAX_LEVEL and MIN_LEVEL.
Prev_At_Speed, flag, indicates if vehicle has reached a predetermined speed to trigger the level adjustment calculation after next deceleration event, initialized to false.
MIN_LEVEL, constant, the lowest potential level allowed to be reached, oftentimes the absolute minimum potential of the storage device.
MAX_LEVEL, constant, the highest potential level to be reached, oftentimes the absolute maximum potential of the storage device.
MAX_TARGET_LEVEL, constant, the highest artificial minimum potential allowed, set to preserve a minimum working range.
LEVEL_STEP, constant, the step value for target level adjustment, could also be a parameter resulting from a transfer function.
LEVEL_ADJ_THRESHOLD, constant, minimum speed threshold before the level adjustment calculation can be triggered.
AT_REST_THRESHOLD, constant, speed threshold below which the vehicle is considered to be at rest.

---

```
INITIALIZE:
.
.
.
Prev_At_Speed = FALSE
TargetLevel = ((MAX_LEVEL − MIN_LEVEL) / 2) + MIN_LEVEL
.
.
.
End INITIALIZE
CONTROL LOOP:
.
.
.
If VehicleSpeed > LEVEL_ADJ_THRESHOLD Then
    Prev_At_Speed = TRUE
End If
If VehicleSpeed < AT_REST_THRESHOLD Then
    If Prev_At_Speed = TRUE Then
        If PotentialLevel >= MAX_LEVEL Then
            TargetLevel = TargetLevel − LEVEL_STEP
            If TargetLevel < MIN_LEVEL Then
                TargetLevel = MIN_LEVEL
            End If
        Else
            TargetLevel = TargetLevel + LEVEL_STEP
```

-continued

```
            If TargetLevel > MAX_TARGET_LEVEL Then
                TargetLevel = MAX_TARGET_LEVEL
            End If
        End If
        Prev_At_Speed = FALSE
    End If
End If
.
.
.
Go to CONTROL LOOP
```

An example of an algorithm in pseudo code showing the adjustment of the artificial minimum charge level with the energy storage potential measured prior to an acceleration event is shown below.

Pseudo Code for Adjusting Artificial Minimum Charge Level

Energy Storage Potential Measured Prior to an Acceleration Event

Simplest Form

The following algorithm is executed every iteration of the control loop. Ideally, the control loop is executed several times per second.

The variables, constants, and flags indicated in the algorithm are defined as follows:

VehicleSpeed, variable, measure of vehicle ground speed.
PotentialLevel, variable, measure of energy storage potential (e.g. voltage).
TargetLevel, variable, artificial minimum potential level to reach during discharge events, can be initialized to the midpoint between MAX_LEVEL and MIN_LEVEL.
Prev_At_Speed, flag, indicates if vehicle has reached a predetermined speed to trigger the level adjustment calculation after next deceleration event, initialized to false.
MIN_LEVEL, constant, the lowest potential level allowed to be reached, oftentimes the absolute minimum potential of the storage device.
MAX_LEVEL, constant, the highest potential level to be reached, oftentimes the absolute maximum potential of the storage device.
MAX_TARGET_LEVEL, constant, the highest artificial minimum potential allowed, set to preserve a minimum working range.
LEVEL_STEP, constant, the step value for target level adjustment, could also be a parameter resulting from a transfer function.
LEVEL_ADJ_THRESHOLD, constant, minimum speed threshold before the level adjustment calculation can be triggered.
AT_REST_THRESHOLD, constant, speed threshold below which the vehicle is considered to be at rest.
Torque Request, variable, indicator of drive torque requested of the hybrid system.
ZERO_TORQUE, constant, torque threshold below which the hybrid drive applies no driving torque.

```
INITIALIZE:
.
.
.
Prev_At_Speed = FALSE
TargetLevel = ((MAX_LEVEL – MIN_LEVEL) / 2) + MIN_LEVEL
.
.
.
End INITIALIZE
CONTROL LOOP:
.
.
.
If VehicleSpeed > LEVEL_ADJ_THRESHOLD Then
    Prev_At_Speed = TRUE
End If
If VehicleSpeed < AT_REST_THRESHOLD Then
    If Prev_At_Speed = TRUE Then
        If TorqueRequest > ZERO_TORQUE Then
            If PotentialLevel >= MAX_LEVEL Then
                TargetLevel = TargetLevel – LEVEL_STEP
                If TargetLevel < MIN_LEVEL Then
                    TargetLevel = MIN_LEVEL
                End If
            Else
                TargetLevel = TargetLevel + LEVEL_STEP
                If TargetLevel > MAX_TARGET_LEVEL Then
                    TargetLevel = MAX_TARGET_LEVEL
                End If
            End If
            Prev_At_Speed = FALSE
        End If
    End If
End If
.
.
.
Go to CONTROL LOOP
```

As may be appreciated from the foregoing, other algorithms and programming may be used to bring about the results described herein, such as is illustrated in FIGS. 1 and 2.

Figure 3:
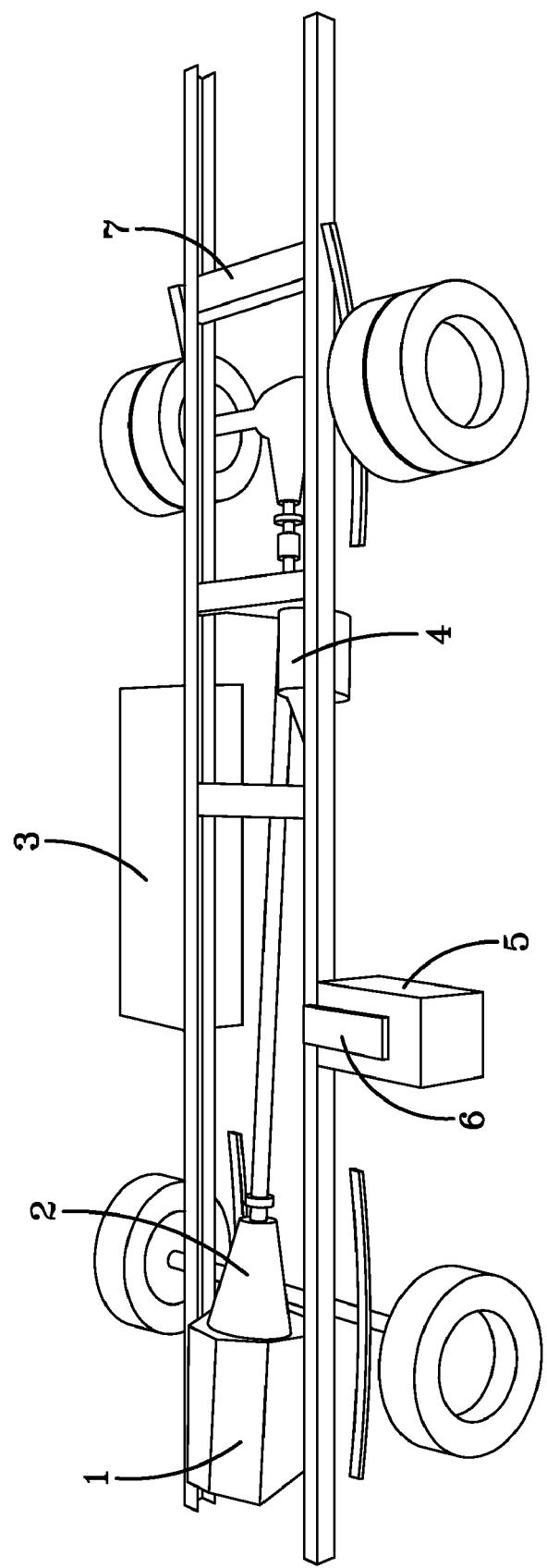
FIG. 3 shows a schematic of a hybrid electric vehicle in accordance with one embodiment of the present invention.

FIG. 3 shows a schematic of a hybrid electric vehicle in accordance with one embodiment of the present invention. FIG. 3 shows Internal combustion engine 1 (e.g., Cummins ISB170 Diesel), Multi-speed automatic transmission 2, (e.g., Allison T2000 series), Ultracapacitor energy storage unit 3, (e.g., Maxwell BCAP series cells, 400 Volt maximum), Induction motor 4, (e.g., liquid cooled NEMA 215 frame, EVI Part 205-0000), Induction motor inverter/controller 5, (e.g., IGBT-based EMS FluxDrive 7), Hybrid supervisory controller with CAN interface 6 (e.g., 8-bit microcontroller based, PIC18F248), Commercial truck chassis 7, (e.g., 15,000 pound GVWR, Workhorse Custom Chassis) and Vehicle control network 8 (e.g., Controller Area Network (CAN), SAE J1939 protocol).

Figure 4:
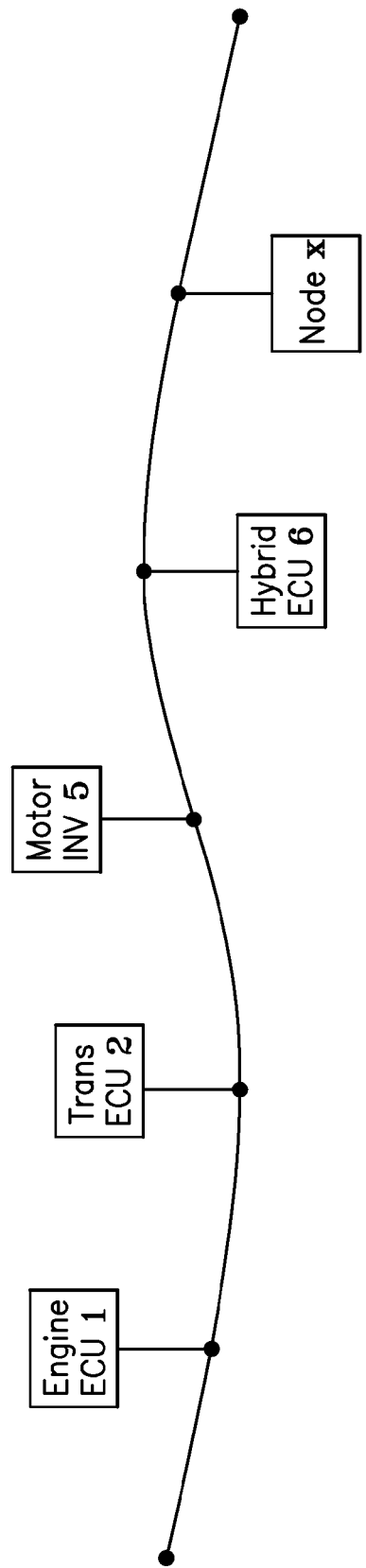
FIG. 4 is a schematic representation of the control nodes that may be used in accordance with one embodiment of the present invention.

FIG. 4 is a schematic representation of the control nodes that may be used in accordance with one embodiment of the present invention.

In accordance with the preferred embodiment, a parallel electric hybrid is provided which uses ultracapacitors as the energy storage device. As electric power is transferred in and out of the bank of ultracapacitors through successive discharge and charge events, the present invention works to maximize the usefulness of the ultracapacitor bank by regulating the minimum discharge set point.

As indicated above, the major system components of the hybrid vehicle are linked together via an electronic data bus that allows for control and state messages to be passed freely between connected nodes (as shown schematically in FIG. 4). This embodiment uses a standard high-speed data network commonly used in commercial medium and heavy duty truck and bus systems. The network is based on the Controller Area Network (CAN) topology commercially available from Robert Bosch and preferably utilizes the Society of Automotive Engineers (SAE) J1939 software protocol which dictates a message bit rate of 250K bits per second and message addressing conventions.

Conventional medium and heavy duty vehicles typically link the engine, transmission, and brake systems on the network for control and data sharing. Tens of standard messages are broadcast by these nodes several times per second. The hybrid components of this embodiment also use this electronic network. Nodes key to the present invention that link the motor drive and the hybrid supervisory controller to the network are added. Other hybrid component nodes which supplement the supervisory controller are also added. These include a brake pedal module, a dashboard/display module, an ultracapacitor module, and a motor/gearbox module.

The supervisory controller of this embodiment is an electronic controller that accepts and transmits data messages from the network and executes algorithms to elicit behavior from the motor drive, engine, and transmission of the vehicle, although equivalent controllers may be used. This behavior creates the expected hybrid performance, such as supplanting engine torque with motor torque under acceleration and supplanting friction braking with reverse motor torque under deceleration. Also, the present invention allows an optimizing of the use of the hybrid energy storage unit.

The controller preferably is based on an 8-bit microcontroller from Microchip, the PIC18F248. The algorithms of the present invention are translated from a high-level programming language, such as C or Basic, to machine code that can be written to the microcontrollers FLASH program memory. For instance, the algorithms are coded into Basic, compiled into Assembly language, then assembled and linked into machine code for the particular PIC device. The machine code, typically in the form of a string of hexadecimal numbers, is then programmed into the FLASH memory of the target microcontroller using a hardware programming device. Once programmed, the microcontroller begins execution of the algorithms immediately after power is applied.

Vehicle speed and potential level of the energy storage device, in the case of ultracapacitors, Voltage. The state of charge (or energy state) of the ultracapacitor follows directly the following relation, $$energy = \tfrac{1}{2} * capacity * potential^2,$$

where energy is in Joules, capacity is in Farads, and potential is in Volts.

Assuming that the capacity of the device does not change with operation, it can be seen that the energy level of the device is directly proportional to the square of the potential, or of voltage. Therefore, a simple measure of the ultracapacitor voltage can allow one to derive the energy level rather easily and is the basis of the algorithm of the present invention. The capacity of the ultracapacitor or similar energy storage device can be obtained experimentally or by consulting the manufacturer's specifications.

Aside from the 10 Hz control loop, the supervisory controller is also programmed to watch the network traffic on the CAN bus for messages of interest, particularly the ones cited above. When a message of interest is detected, the active process is interrupted and the message is decoded and the data elements stored. This ensures that state parameters used in the algorithms, such as vehicle speed and ultracapacitor voltage, are current.

During each pass of the control loop the state parameters and local variables are evaluated and the algorithms executed. Simple example algorithms of the present invention are provided in pseudo code. The algorithm of the present invention can be made perhaps more effective by incorporating other sophisticated techniques. These techniques may include predictive elements, the use of energy level instead of potential level for adjustment strategy, and others as indicated elsewhere.

Many other changes and modifications may be made to the present invention without departing from the spirit thereof. The scope of these and other changes will become apparent from the appended claims.

What is claimed is:

1. A hybrid electric vehicle comprising:
a drive train;
an electric motor for driving said drive train;
a power unit electrically coupled to said electric motor;
an electric energy storage system electrically coupled to said electric motor, said electric energy storage system adapted to recapture energy from the braking of said vehicle so as to be capable of discharging and recapturing energy through a series of discharge and energy recapture events, and having a maximum charge level and an actual minimum charge level; and
wherein said power unit and said electric energy storage system provide electricity to said electric motor for powering said vehicle; and
an electric energy storage controller programmed to control said electric energy storage system by setting an artificial minimum charge level to an initial level above said actual minimum charge level, and, during a series of discharge and energy recapture events, to be able to adjust said artificial minimum charge level such that:
(a) in the case where a discharge and energy recapture event results in the recapture of insufficient energy to recharge said electric energy storage system to said maximum charge level, said artificial minimum charge level is raised; and
(b) in the case where a discharge and energy recapture event results in the recapture of sufficient energy to recharge said electric energy storage system to said maximum charge level, said artificial minimum charge level is lowered.

2. A hybrid electric vehicle according to claim 1 wherein said electric energy storage controller is further programmed to control said electric energy storage system by restricting the raising of said artificial minimum charge level beyond a predetermined level below said maximum charge level.

3. A hybrid electric vehicle according to claim 1 wherein said electric energy storage controller is further programmed to control said electric energy storage system by restricting the lowering of said artificial minimum charge level beyond a predetermined level above said actual minimum charge level.

4. A hybrid electric vehicle according to claim 1 wherein said energy storage system is a bank of ultracapacitors.

5. A hybrid electric vehicle according to claim 1 additionally comprising an internal combustion engine and a generator adapted to charge said energy storage system with electrical energy.

6. A hybrid electric vehicle comprising:
a drive train;
an electric motor for driving said drive train;
a power unit electrically coupled to said electric motor;
an electric energy storage system electrically coupled to said electric motor, said electric energy storage system adapted to recapture energy from the braking of said vehicle so as to be capable of discharging and recapturing energy through a series of discharge and energy recapture events, and having a maximum charge level and an actual minimum charge level having a working range therebetween and which working is defined at its lower end by an artificial minimum charge level; and
wherein said power unit and said electric energy storage system provide electricity to said electric motor for powering said vehicle; and
an electric energy storage controller programmed to control said electric energy storage system by setting an artificial minimum charge level to an initial level above said minimum charge level, and, during a series of discharge and energy recapture events, to be able to adjust said artificial minimum charge level such that the working range of said electric energy storage system is biased toward said maximum charge level over said series of discharge and energy recapture events.

* * * * *